(12) United States Patent
Feldtkeller

(10) Patent No.: US 8,184,736 B2
(45) Date of Patent: May 22, 2012

(54) ENCODING BITS INTO SIMULTANEOUS PULSE PAIRS

(75) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 1194 days.

(21) Appl. No.: 11/865,960

(22) Filed: Oct. 2, 2007

(65) Prior Publication Data

US 2008/0080624 A1     Apr. 3, 2008

(30) Foreign Application Priority Data

Oct. 2, 2006  (EP) .................................. 06020754

(51) Int. Cl.
 *H04B 15/00* (2006.01)
(52) U.S. Cl. ........ 375/285; 375/265; 375/278; 375/284; 375/324
(58) Field of Classification Search .................. 375/285, 375/265, 278, 284, 324
See application file for complete search history.

(56) References Cited

U.S. PATENT DOCUMENTS

| 4,442,515 A * | 4/1984 | Meitzler ....................... 367/197 |
| 6,525,566 B2 | 2/2003 | Haigh et al. |
| 7,587,193 B2 | 9/2009 | Feldtkeller |

FOREIGN PATENT DOCUMENTS

| DE | 19838109 | 2/2000 |
| DE | 10205705 | 5/2003 |
| DE | 102004039218 | 3/2006 |
| DE | 102005020615 | 11/2006 |
| EP | 1855297 | 5/2006 |
| WO | 02086969 | 10/2002 |

OTHER PUBLICATIONS

German Search Report for EP06020754.5-2411 dated May 22, 2007.

* cited by examiner

*Primary Examiner* — Kabir A Timory
(74) *Attorney, Agent, or Firm* — Banner & Witcoff, Ltd.

(57) ABSTRACT

Methods and apparatuses for encoding a plurality of bits into a plurality of pairs of simultaneous electrical pulses.

23 Claims, 12 Drawing Sheets

FIG 15
| Z[i+1]-Z[i-1] | Z[i] | |
|---|---|---|
| | Z[i-1] even | Z[i-1] odd |
| 0 | 0 | invalid |
| 1 | 0 | 0 |
| 2 | 1 | 0 |
| 3 | 1 | 1 |
| 4 | invalid | 1 |
| 5 | invalid | invalid |
| 6 | invalid | invalid |
| 7 | invalid | invalid |
FIG 16
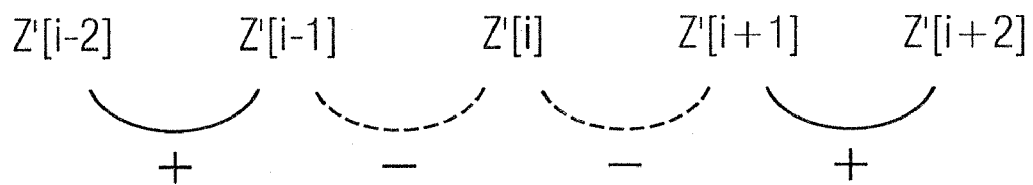
FIG 17
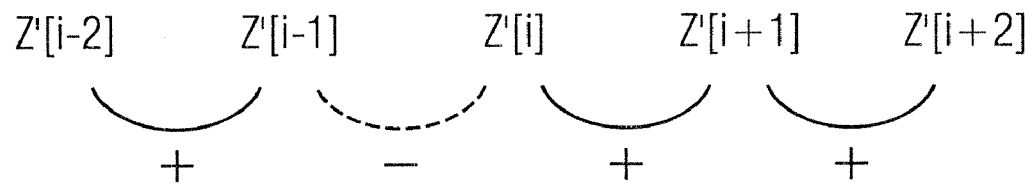

| Z[i]-Z'[i+4] | N | |
|---|---|---|
| | Z'[i-4] even | Z'[i-4] odd |
| 0 | 0 | 3 |
| 1 | 0 | 0 |
| 2 | 1 | 0 |
| 3 | 1 | 1 |
| 4 | 2 | 1 |
| 5 | 2 | 2 |
| 6 | 3 | 2 |
| 7 | 3 | 3 |

# ENCODING BITS INTO SIMULTANEOUS PULSE PAIRS

CROSS-REFERENCE TO RELATED APPLICATIONS

This application claims priority to European patent application no. 06 020 754.5-2411, filed Oct. 2, 2006, hereby incorporated by reference as to its entirety.

BACKGROUND

Transmission of data over a potential barrier is necessary, for example, in data transmission links for actuating semiconductor switches, particularly high-side switches in half-bridge circuits, or in data transmission links for data transmission in industrial controllers. To decouple the potentials of the transmission end and the receiver end, such transmission may involve the use of an inductive transformer having a primary winding and a secondary winding.

SUMMARY

Some aspects as described herein are directed to methods and apparatuses for encoding a plurality of bits into a plurality of pairs of simultaneous electrical pulses These and other aspects of the disclosure will be apparent upon consideration of the following detailed description of illustrative aspects.

BRIEF DESCRIPTION OF THE DRAWINGS

Various illustrative embodiments will be explained below with reference to figures. In the figures, unless otherwise stated, identical reference symbols denote the same circuit components and signals with the same meaning.

FIG. 15 shows an illustrative first error correction mode for the encoding method.

FIG. 16 shows an illustrative first possible error scenario for the transmission of data words.

FIG. 17 shows an illustrative second possible error scenario for the transmission of data words.

FIG. 18 shows an illustrative third possible error scenario for the transmission of data words.

FIG. 19 shows an illustrative a second error correction mode for the encoding method.

DETAILED DESCRIPTION

The various aspects summarized previously may be embodied in various forms. The following description shows by way of illustration various examples in which the aspects may be practiced. It is understood that other examples may be utilized, and that structural and functional modifications may be made, without departing from the scope of the present disclosure.

Except where explicitly stated otherwise, all references herein to two or more elements being "coupled," "connected," and "interconnected" to each other is intended to broadly include both (a) the elements being directly connected to each other, or otherwise in direct communication with each other, without any intervening elements, as well as (b) the elements being indirectly connected to each other, or otherwise in indirect communication with each other, with one or more intervening elements.

Figure 1:
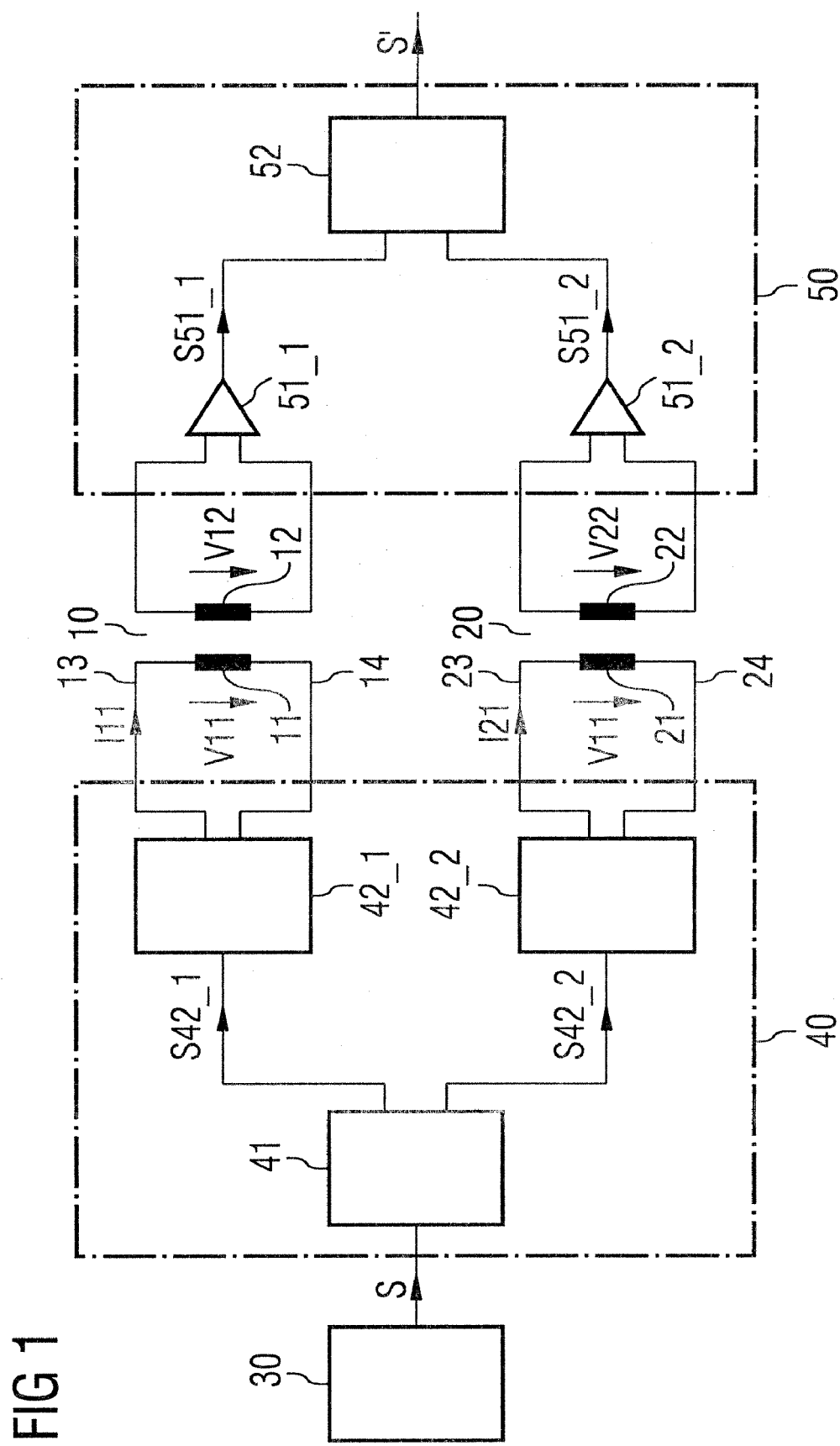
FIG. 1 schematically shows an illustrative data transmission link with a transmission channel having two inductive transformers.

FIG. 1 schematically shows an illustrative embodiment of a data transmission link for transmitting a data signal S provided by a data source 30 over a potential barrier. A transmission channel in this particular data transmission link has two inductive transformers 10, 20 which respectively have a primary winding 11, 21 and a secondary winding 12, 22. By way of example, these inductive transformers 10, 20 may be embodied as what are known as air-core transformers, which are also referred to as coreless transformers. Air-core transformers have no transformer cores for amplifying inductive coupling between the primary windings and the secondary windings.

Components of the data transmission link shown in FIG. 1 which are connected to the primary windings 11, 21 directly or indirectly will be referred to as primary-side components of the data transmission link, whereas components which are connected directly or indirectly to the secondary windings 12, 22 will be referred to as secondary-side components of the data transmission link.

The data transmission link comprises a data source 30 which provides a data signal S which is to be transmitted. By way of example, this data signal S may be a binary data signal. This data signal S may be a purely useful signal which contains exclusively useful information, but may also be an encoded useful signal which contains not only useful information but also redundant information for error recognition and/or error correction.

In addition, the data transmission link comprises a modulation unit 40 which is supplied with the data signal S and which converts the data signal S to transmission signals V11, V21 for transmission using the inductive transformers 10, 20. In the example, these transmission signals V11, V21 are voltages on the primary windings 11, 21, respectively, which will be referred to as primary voltages V11, V21. The modulation unit 40 comprises an association unit 41 and also two driver circuits 42_1, 42_2, a first driver circuit 42_1 of which is connected to the primary winding 11 of the first transformer 10 and a secondary driver circuit 42_2 of which is connected to the primary winding 21 of the second transformer 20. The association unit 41 maps the data signal S onto first and second driver signals S42_1, S42_2, a first driver signal S42_1 of which is supplied to the first driver circuit 42_1 and a second driver signal S42_2 of which is supplied to the second driver circuit 42_2.

In this example, the transmission signals V11, V21 are produced such that they selectively assume one of three different signal levels, namely a positive signal level, a negative signal level, and zero. In this context, the absolute value of the positive signal level may correspond to the absolute value of the negative signal level. On the basis of the transmission signals V11, V21, the inductive transformers 10, 20 assume a first activation state, a second activation state or a quiescent state. For the explanation below, it is assumed by way of example that a first activation state in one of the transformers 10, 20 exists when that transformer's transmission signal V11, V21 is at a positive signal level, that a second activation state in the transformer 10, 20 exists when that transformer's transmission signal V11, V21 assumes a negative signal level, and that a quiescent state in the transformer 10, 20 exists when the transmission signal V11, V21 is zero. The first activation state of the first transformer 10, that is to say a state in which there is a positive voltage V11 on the transformer's primary winding 11, will be denoted by 1P. 1N will denote the second activation state of the first transformer 10, that is to say the state in which there is a negative voltage V11 on the primary winding 11. Accordingly, 2P will denote the first activation state of the second transformer 20 and 2N will denote the second activation state of this second transformer 20.

Figure 2:
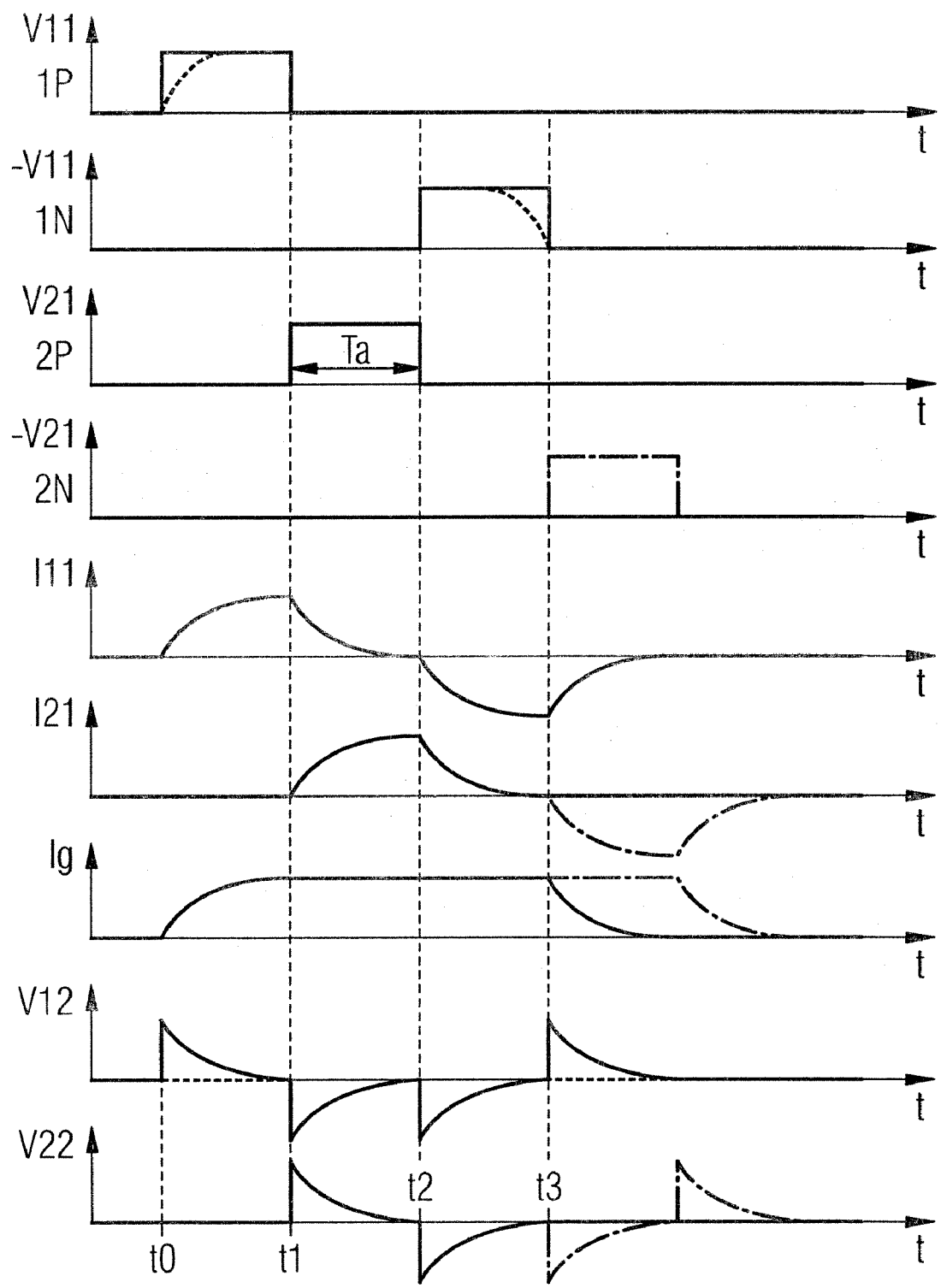
FIG. 2 shows examples of time profiles for selected signals for the transmission of a data sequence in a transmission method.

FIG. 2 shows an example of a series of activation states for the first and second transformers 10, 20. In FIG. 2, respective dedicated time profiles are shown for each of the activation states 1P, 1N, 2P, 2N. In this case, the square-wave signal pulses in the time profile for an activation state mark time periods during which the respective activation state exists. Apart from the time profiles of the activation states, FIG. 2 also shows the time profiles for the primary currents I11, I21 flowing through the primary windings, the time profile for the total current draw Ig for the two transformers 10, 20 (which corresponds to the sum of the two primary currents I11, I21), and the time profiles for secondary voltages V12, V22 across the secondary windings 12, 22 of the two transformers.

The transmission of information using an inductive transformer presupposes the existence of signal level edges in a primary voltage applied to the primary winding of the transformer, as is known. On the secondary side, a voltage rise or voltage fall in the primary voltage results in a voltage pulse which can be evaluated in order to recover the transmitted information. In the case of the data transmission link shown in FIG. 1, sufficiently steep rising edges of the primary voltages V11, V21 result in sufficiently positive voltage pulses for the secondary voltages V12, V22, whereas sufficiently steep falling edges of the primary voltages V11, V21 result in sufficiently negative voltage pulses for the secondary voltages V12, V22. With reference to FIG. 2, such positive edges of the primary voltages V11, V21 arise when the transformers 10, 20 change from the quiescent state to the first activation state 1P or 2P and when the two transformers 10, 20 change from the second activation state 1N or 2N to the quiescent state. The two transformers 10, 20 respectively are put alternately into one of the two possible activation states. The time period for which the transformers 10, 20 are respectively activated in this context will be referred to as the activation period Ta. At the time at which one transformer is deactivated and the other transformer is activated, the secondary side produces a voltage pulse both on the first secondary winding 12 and on the second secondary winding 22. Times at which one of the transformers is activated and the other transformer is deactivated are denoted by t1, t2, t3 in FIG. 2.

Figure 3:
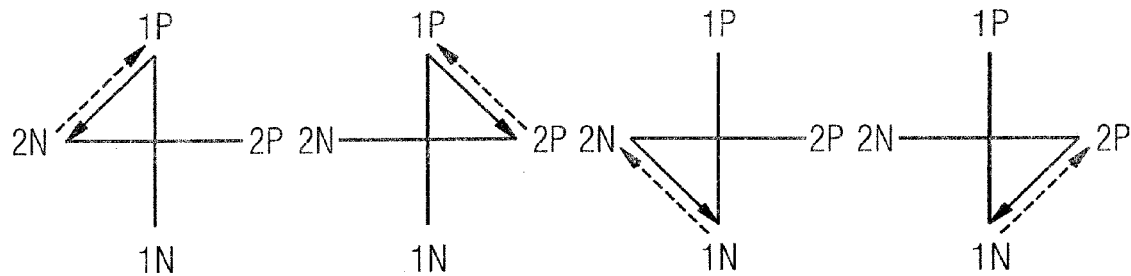
FIG. 3 shows illustrative possible state changes between activation states for the two inductive transformers.

Changes from an activation state of one transformer to an activation state of the other transformer will be referred to as state changes. The information is transmitted by state changes which prompts the secondary side to produce voltage pulses on both secondary windings 12, 22. For the explanation which follows, these state changes will be presented in the form of vectors. With reference to FIG. 3, illustrative individual activation states are to this end plotted in cross form in the plane of the drawing, with the two different activation states of a transformer respectively being arranged in opposition. Clockwise, the first activation state 1P of the first transformer 10, the first activation state 2P of the second transformer 20, the second activation state 1N of the first transformer 10 and the second activation state 2N of the second transformer 20 are plotted, for example. Vectors which denote the state changes (which will be referred to as change vectors) respectively run from the position denoting the initial state to the position denoting the final state in this case. In total, eight different state changes can arise in this example. However, these state changes are not unique in terms of the signal patterns which arise on the secondary side. Rather, two respective incidences of the possible state changes result in, or map to, identical secondary-side signal patterns, as explained below with reference to FIG. 4.

Figure 4:
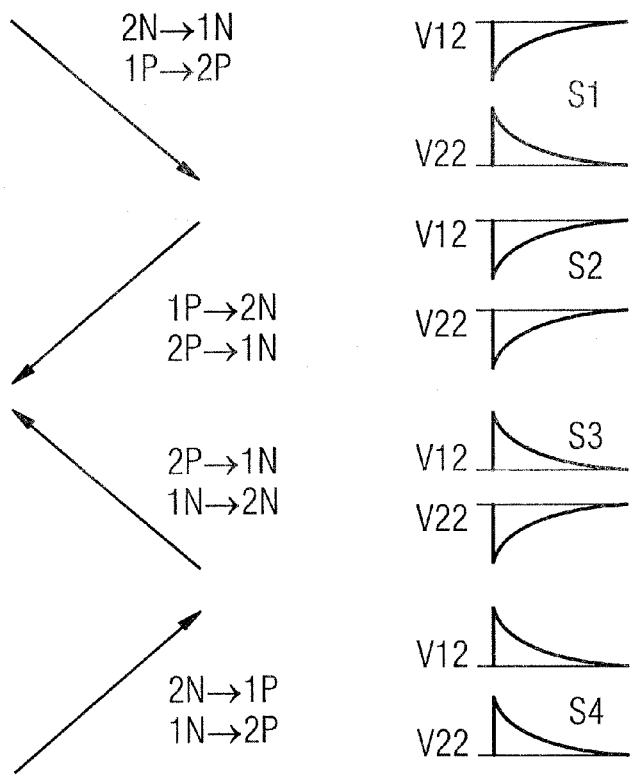
FIG. 4 shows examples of time profiles for voltages which can be tapped from the secondary side of the transformers for different state changes.

FIG. 4 illustrates the four possible secondary-side signal patterns in the present example, denoted by S1 to S4, and the state changes which result in the respective signal patterns using the change vectors associated with the state changes. In this context, a secondary-side signal pattern comprises two voltage profiles, a voltage profile on a first secondary winding 12 and a voltage profile on the second secondary winding 22, and is shown on the right in FIG. 4 in each case. The change vector associated with the signal pattern is shown on the left in FIG. 4. To assist understanding, the origination of one of the signal patterns is explained below. Let us consider the secondary-side signal pattern S1 shown at the top of FIG. 4, in which the first secondary voltage V12 has a negative voltage pulse and the second secondary voltage V22 has a positive voltage pulse. This signal pattern S1 can arise upon a change from the second activation state 2N of the second transformer 20 to the second activation state 1N of the first transformer 10 or upon a change from the first activation state 1P of the first transformer 10 to the first activation state 2P of the second transformer 20. In the case of both state changes, the primary voltage V11 has a negative signal edge and the secondary primary voltage V21 has a positive signal edge.

Four different signal patterns may arise on the secondary side, these being denoted by S1 to S4 in FIG. 4. However, in the present example, these signal patterns do not arise in any order, which becomes clear from the vector diagram in FIG. 3 on account of the fact that only two state changes arise from an activation state of one of the transformers. In FIG. 2, the fact that the four different signal patterns do arise in any order becomes clear through the circumstance that, in the present example, a secondary-side signal pulse arising upon activation of a transformer is always followed by a secondary-side signal pulse with the opposite arithmetic sign, which arises upon deactivation of the respective transformer.

The basic concept of putting the two transformers alternately into two possible activation states which is described above is suitable in various ways for transmitting a data signal. As already mentioned, a single secondary-side signal pattern may not be used to uniquely determine the state change which led to this signal pattern. However, it can be shown that while observing a constraint it is possible to explicitly determine two chronologically successive state changes, resulting in two chronologically successive signal patterns, from these signal patterns provided that the state changes are chosen such that they take place between three different activation states, that is to say provided that a change from a first state to a second state is not followed by a change back to the first state.

Figure 5:
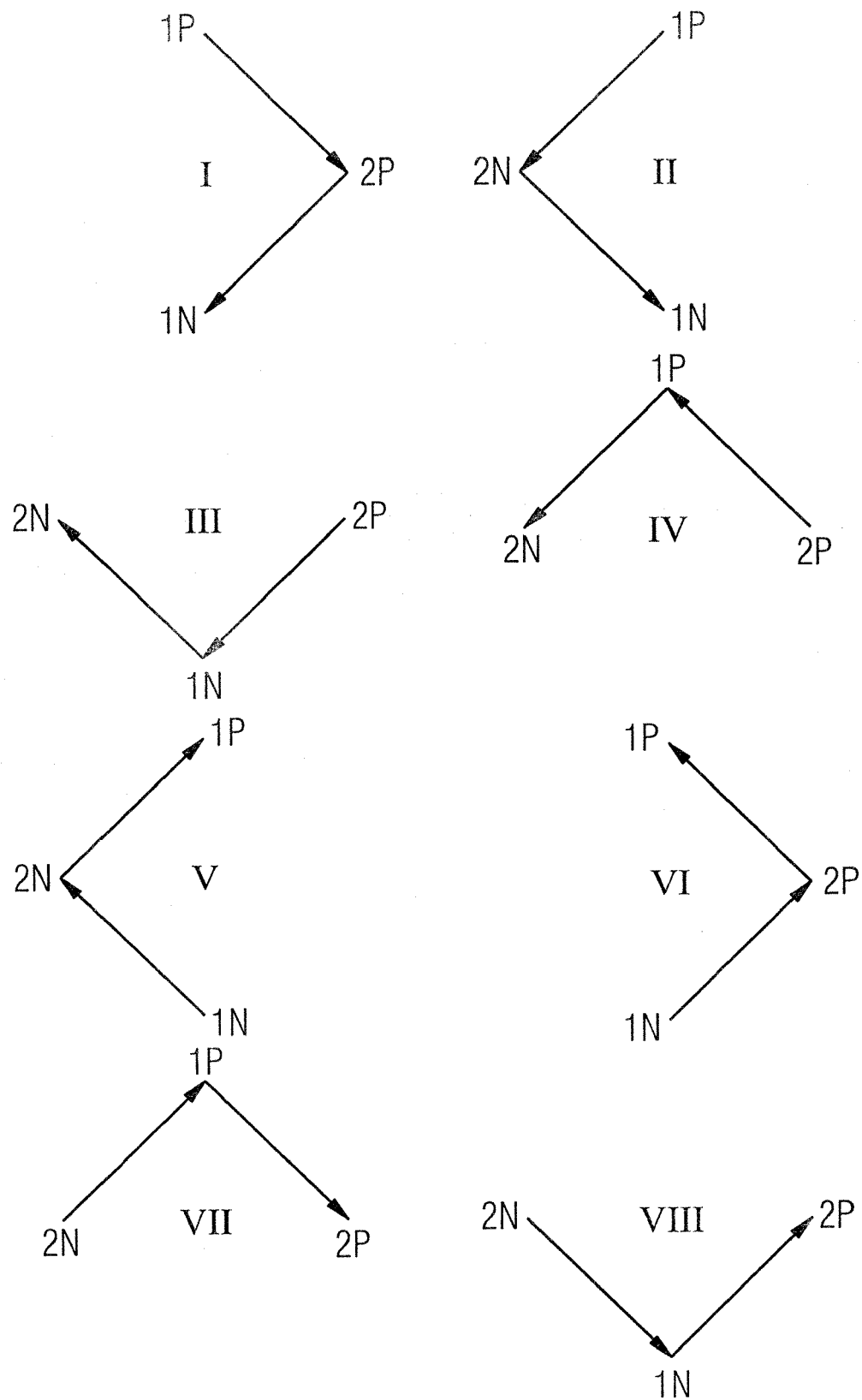
FIG. 5 shows illustrative combinations of two respective state changes for the transmission of a three-bit signal.

In total, eight different successions with two successive state changes can be produced in this example, these being shown in FIG. 5 using the change vectors and being numbered with the numerals I to VIII. The uniqueness of these successions with two respective state changes is explained below with the aid of the following example.

Let us consider the state succession I, which has the state changes 1P-2P and 2P-1N. With reference to FIG. 4, the state change 1P-2P results in the secondary-side signal pattern S1, which is also produced by the state change 2N-1N. The activation state 2P at the end of the first state change in the considered succession I can be followed only by a state change 2P-1N to the activation state 1N, while the activation state 1N for the state change 2N-1N can be followed only by a state change 1N-2P to the activation state 2P. On the secondary side, the state changes 2P-1N and 1N-2P result in different signal patterns, however, namely the signal pattern S2 on the one hand and the signal pattern S4 on the other hand, from which it directly follows that two successive state changes result in a uniquely distinguishable succession of two secondary-side signal patterns.

Since eight different successions with two respective state changes are possible, a respective three-bit data word in the data string may be mapped onto a unique transmission signal sequence with two state changes. A transmission signal sequence of this kind comprises three different and chronologically successive transmission signals which are applied to the two transformers 10, 20 at alternate times. An illustrative transmission signal sequence resulting in two state changes is shown in solid lines in FIG. 2. The transmission signal sequence shown in the example with a time series comprising a positive voltage pulse +V11 on the first primary winding 11, a positive voltage pulse +V21 on the second primary winding 21 and a negative voltage pulse −V11 on the first primary winding 11, represents the state succession 1P-2P-1N, which results in the secondary-side signal patterns S1 at a time t1 and S2 at a time t2.

Relevant features for the information transmission in the inventive method are state changes from one of the activation states of one of the transformers to an activation state of the other of the transformers. At the times of such state changes, for example the times t1 and t2 in FIG. 2, the steep voltages edges of the transmission signals are produced on the primary side which result in voltage pulses on both secondary windings 12, 22 on the secondary side.

Secondary-side voltage pulses on just one of the secondary coils, such as those that arise in FIG. 2 at times t0 and t3 at the start of the first transmission signal in the transmission signal sequence and at the end of the final transmission signal in the transmission signal sequence, may not be necessarily needed for the information transmission. To avoid such signal pulses on just one secondary winding, it is possible to shape the first transmission signal and the final transmission signal in the transmission signal sequence such that the absolute value of the voltage of the first transmission signal in the transmission signal sequence rises slowly at the start of this transmission signal and that the absolute value of the voltage of the final transmission signal in the transmission signal sequence falls slowly at the end of this final transmission signal. This is shown in broken lines in FIG. 2. This slow rise in the voltage at the start of the transmission signal sequence and the slow fall in the primary voltage at the end of the transmission signal sequence result in little to no voltage pulses (or very small voltage pulses) being induced in the secondary windings 12, 22 at the start of the transmission signal sequence and at the end of the transmission signal sequence, which is likewise shown in broken lines in FIG. 2 for the voltage profile for the voltage in V12, V22 across the secondary windings 12, 22.

Aspects as described herein may allow self-synchronizing data transmission without necessarily providing the additional transmission of a clock signal for data recovery. Furthermore, the total current draw Ig in the modulation circuit 40 may be substantially constant during the data transmission in this method, which may reduce or even prevent EMC interference radiation from supply lines (not shown) to the modulation circuit 40.

As already explained, it is possible to distinguish eight different signal sequences with two successive state changes, which are shown in FIG. 5. These eight state changes can be derived from the state succession I (1P-2P-1N) by rotating the vector diagram for this state succession clockwise or counterclockwise in 90° steps and by mirroring the vector diagram obtained in this manner about an imaginary line which runs through the initial state and the final state. Thus, the state succession III is obtained from the state succession I by rotating the vector diagram 90° clockwise, for example. The state succession IV is obtained by the state succession III by mirroring the vector diagram on an imaginary line running through the initial and final states 2P, 2N. This mirroring of the vector diagram prompts a reversal in the order of the secondary-side pulses. In the previously cited example, the vector diagram III comprises the state succession 2P-1N-2N. On the secondary side, this results in the signal patterns S2 and S3 in succession. In the case of the vector diagram IV with the state succession 2P-1P-2N, the voltage pulses S3 and S2 are produced in succession on the secondary side.

Figure 6:
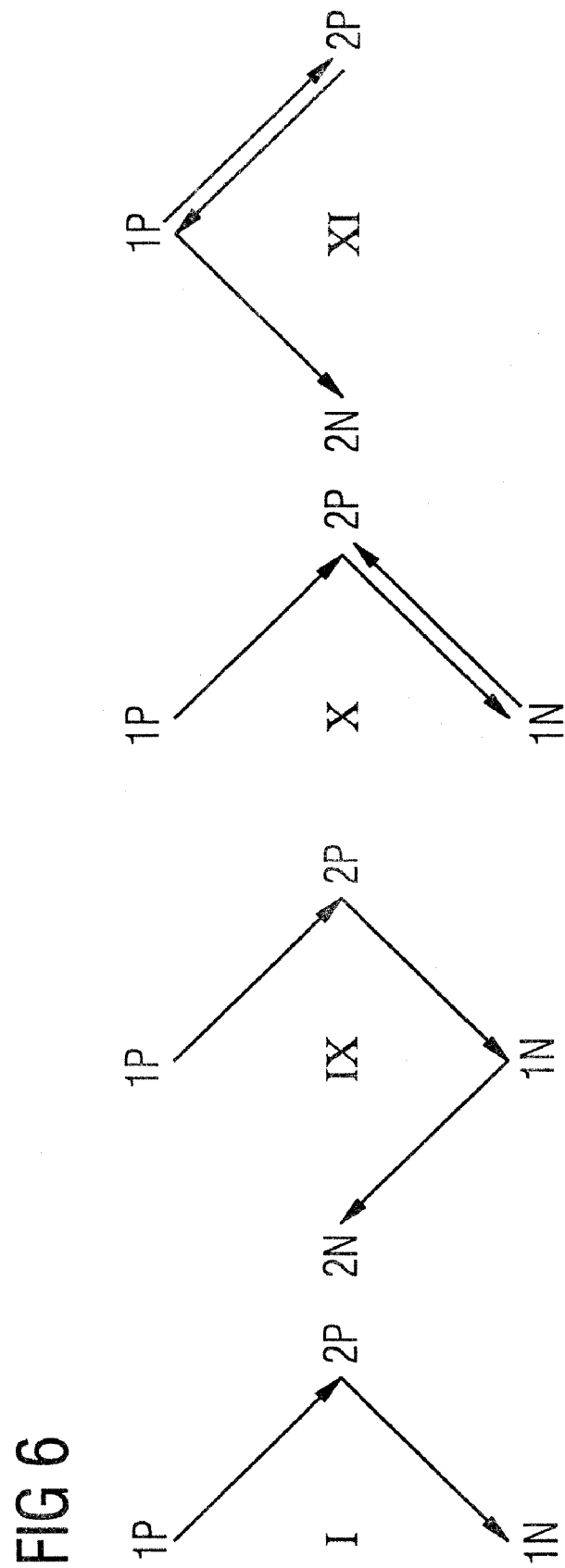
FIG. 6 shows illustrative combinations of two or three state changes for the transmission of a five-bit data word.

As already explained, state successions with two state changes running between three different activation states can be explicitly distinguished using the secondary-side signals of the transformers 10, 20. Such a state succession with two state changes can have at least one further state change added to it in any fashion, which is shown in FIG. 6 by the state successions IX, X and XI. These state successions IX, X and XI represent, on the basis of state succession I, basic structures for state changes from which it is possible to derive seven respective further state successions with three respective state changes by rotating the vector diagram clockwise and counterclockwise in 90° steps and by mirroring about an imaginary, diagonally running line. In total, it is thus possible to distinguish 32 state successions with two or three state changes, namely 8 state successions with two changes and 24(=3·8) state successions with three respective state changes. In some embodiments, provision may be made for data strings with five respective bits to be converted to a transmission signal sequence with two or three state changes, each of the $2^5=32$ different 5-bit transmission strings being assigned one of the 32 possible signal sequences with two or three respective state changes by the modulation circuit 40.

Figure 7:
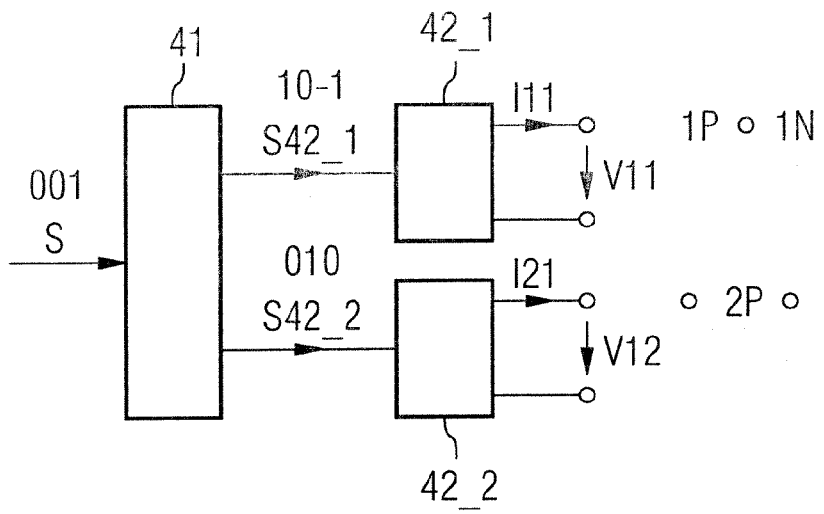
FIG. 7 shows illustrative actuation of inductive transformers on the basis of a three-bit data word with the aid of an exemplary embodiment.

The way in which the modulation circuit 40 may operate to convert a data sequence N to transmission signals V11, V12 is explained below with reference to FIG. 7 for the transmission of a 3-bit data word. For the purposes of the explanation, it will be assumed here that the 3-bit data word "001", which has the associated state succession 1P-2P-1N, for example, is being transmitted. In the example, the association unit 41 converts this 3-bit data word to driver signals S42_1, S42_2 for the driver circuits 42_1, 42_2. In this case, the driver signals S42_1, S42_2 produced by the association unit 41 are respectively signal sequences with three successive signals, each of which can assume three different signal values, represented by 1, 0 and −1 in FIG. 7, and which are chosen such that the desired succession of state changes in the two transformers occurs. The signal values 1 and −1 in FIG. 7 represent the two activation states of the transformer actuated by the respective driver circuit 42_1, 42_2, while the signal value 0 represents the quiescent state of the respective transformer. A signal succession 1 0 −1 for the first driver signal S42_1, as shown in FIG. 7, thus results in a state succession 1P 0 1N for the first transformer (10 in FIG. 1), and a signal succession 0 1 0 for the second driver signal S42_2 results in a state succession 0 2P 0 for the second transformer (20 in FIG. 1). These two state successions prompt reciprocal activation of the two transformers such that the succession 1P-2P-1N of activation states for the two transformers which is associated with the data word "001" occurs. By way of example, the association unit 41 may be implemented in the form of a lookup table storing the associated driver signal successions S42_1, S42_2 for each of the $2^3$=8 possible 3-bit data words.

Figure 8:
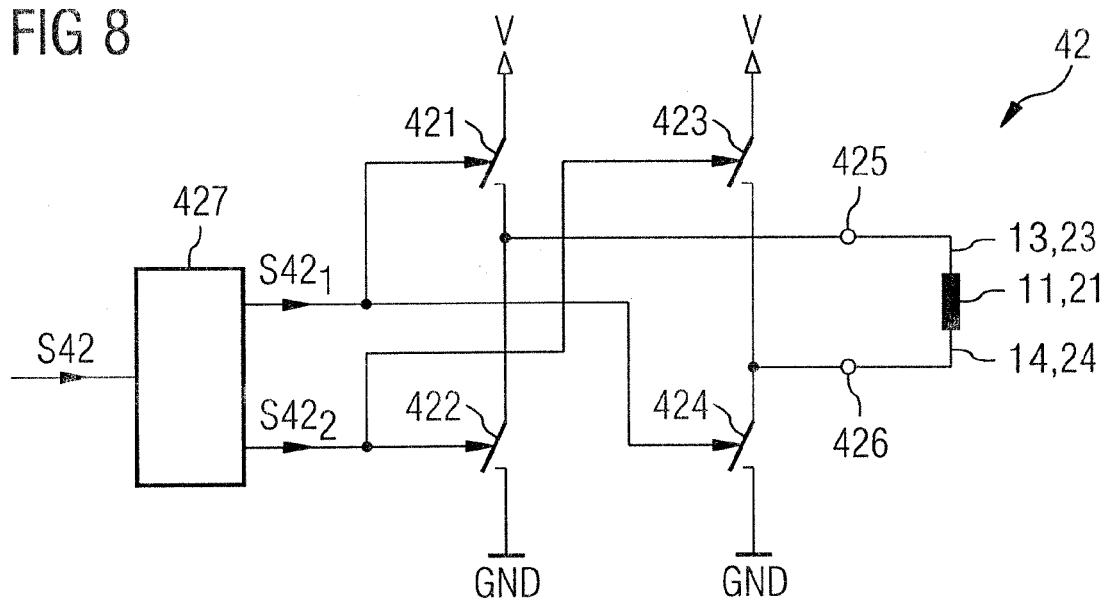
FIG. 8 shows an implementation example of a driver circuit for actuating the inductive transformers in the transmission channel.

FIG. 8 shows an illustrative implementation of the two driver circuits 42_1, 42_2, which are suited to putting the two transformers into the first activation state, the second activation state or the quiescent state as governed by the driver signals. The driver circuit 42 in FIG. 8 is representative of a respective one of these driver circuits 42_1, 42_2. This driver circuit 42 comprises a full-bridge circuit, made up of two half-bridge circuits, with outputs 425, 426 which, during operation of the driver circuit 42, have the primary winding 11, 21 of the transformer actuated by the driver circuit connected between them. The two half-bridge circuits each have a first switch 421, 423 and a second switch 422, 424 which are respectively connected in series between a terminal for a positive supply potential V and a negative supply potential or reference-ground potential GND. An output of the first half bridge is formed by a node which is common to the switches 421, 422 and it forms the first output 425 of the full bridge, while an output of the second half-bridge circuit is formed by a node which is common to the switches 423, 424 and it forms the second output 426 of the full bridge. The driver circuit 42 has an actuating circuit 427 for the switches 421-424 in a bridge circuit. This actuating circuit 427 is supplied with the driver signal S42, which is one of the two driver signals S42_1, S42_2 in FIG. 1, and is used to actuate the switches 421-424 on the basis of the driver signal S42 such that they respectively assume one of three different actuation states.

A first actuation state for the bridge circuit obtains when the first switch 421 in the first half bridge and the second switch 424 in the second half bridge have been turned on while a first switch 423 and a second half bridge and a second switch 422 in the first half bridge are off. The first and second outputs 425, 426 then have a positive voltage between them whose absolute value corresponds to the difference between the positive supply potential V and reference-ground potential GND. This first actuation state of the driver circuit 42 results in a first actuation state of the transformer connected to the driver circuit. A second actuation state of the driver circuit 42 obtains when the first switch 423 in the second half bridge and the second switch 422 in the first half bridge are on while the first switch 421 in the first half bridge and a second switch 424 in the second half bridge are off. The first and second outputs 425, 426 of the bridge circuit then have a negative voltage between them whose absolute value corresponds to the difference between the positive supply potential V and reference-ground potential GND. This second actuation state of the driver circuit 42 prompts the second activation state of the transformer respectively connected to the driver circuit 42. A third actuation state of the driver circuit 42 obtains when the first switches 421, 423 in the bridge circuit are off and the second switches 422, 424 are on. An output voltage from the bridge circuit is then zero, which corresponds to a quiescent state for the transformer respectively connected to the driver circuit 42. When the second switches 422, 424 are on, the edge gradient at the end of an actuation state may be determined by the speed of the switches and may not be determined by parasitic effects in the primary winding.

It should be pointed out that the illustration of the driver circuit in FIG. 8 using ideal switches serves only to explain a fundamental way in which a suitable driver circuit may work. A total current Ig as shown in FIG. 2, which is constant for the period of data transmission following a transient process, may not be achieved, however, with a driver circuit as shown in FIG. 8 which is implemented using ideal switches. A current profile of this kind presupposes that the exponentially decaying current in one transformer after a state change and the exponentially rising current after this state change are complementary to one another, i.e. their sum always corresponds to a constant current (Ig in FIG. 2) drawn via the supply terminals. The presently deactivated transformer draws the exponentially decaying current via the supply terminals for this purpose. This can be achieved by a driver circuit which, instead of the ideal switches shown in FIG. 8, uses transistors (such as bipolar transistors) which do not have diodes connected in parallel with their load paths and in which the current consequently flows via one of the transistors connected to the positive supply potential V and one of the transistors connected to the reference-ground potential GND, respectively.

In the example shown, the actuating circuit 427 takes the driver signal S42, which may assume three different signal values with reference to FIG. 7, and produces two actuating signals S42_1, a first $S42_1$ of which actuates the first switch 421 in the first half bridge and a second switch 424 in the second half bridge, and a second $S42_2$ of which actuates the first switch 423 in the second half bridge and the second switch 422 in the first half bridge. For the purposes of explanation, it will be assumed that the two actuating signals $S42_1$, $S42_2$ are binary signals which can each assume a high level and a low level and that the switches 421-424 are on when the respective actuating signal is at a high level and are off when the respective actuating signal is at a low level. A high level for the first actuating signal S42_1 results in a first activation state of the transformer connected to the driver circuit, while a high level for the second actuating signal S42_2 results in the second activation state of the respectively connected transformer. Low levels for both actuating signals bring about the quiescent state of the respectively connected transformer. Referring to the example explained with reference to FIG. 7, the actuating circuit 427 converts a signal value "1" for the driver signal to a high level for the first actuating signal S42_1, converts the signal value "−1" for the driver signal S42 to a high level for the actuating signal $S42\_2$, and converts a signal value "0" to a low level for both actuating signals $S42_1$, $S42_2$.

In this connection, it will be noted that the illustration of the three different signal values of the driver signals $S42\_1$, $S42\_2$ by 1, 0 and −1 is to be understood merely by way of example. Association unit 41 may also be implemented such that it actually provides binary driver signals $S42\_1$, $S42\_2$. A driver signal value which results in a first activation state for the respective transformer may correspond to a binary signal 10, for example, a driver signal value which results in a second activation state for the respective transformer may correspond to a binary signal 01, while a driver signal value which results in a quiescent state for the respective transformer may correspond to a binary value 00. The most significant bit (MSB) of this two-bit driver signal can then be used directly as the first actuating signal $S42\_1$ in the driver circuit 42, while the least significant bit (LSB) of this two-bit driver signal can be used directly as the second actuating signal $S42_2$ in the driver circuit 42. The actuating circuit 427 for the driver circuit 42 can then be dispensed with.

Data words having a data length of more than 3 bits may also be used. Referring to the explanations regarding FIG. 6, the inventive method allows 32 state successions with two or three respective state changes between activation states of the two transformers (10, 20 in FIG. 1) to be explicitly distinguished. A signal succession having a maximum of 4 activation pulses, which are alternately applied to the two transformers, and which therefore brings about a maximum of three state changes between activation states of the transformers therefore allows a 5-bit data word to be transmitted. The signal succession already explained with reference to FIG. 2 has an additional actuating pulse, in the example an actuating pulse which prompts the activation state 2N of the second transformer, added to it in a dash-dot line in order to illustrate a possible transmission method for a 5-bit data word.

Where a data transmission is performed using signal successions which result in two, three or four state changes (for example), then 80 different data words can be transmitted. This comes from the explanation relating to FIG. 6, according to which it is possible to distinguish 24 successions with three respective state changes. Since each activation state may be adjoined by two different activation states, it is possible to distinguish 2·24=48 state successions with four state changes. The total number of distinguishable state successions with two, three or four state changes is then 8+24+48=80. This may be extended by any number of state changes in order to increase the number of distinguishable data words for transmission still further.

To recover the transmitted data signal S from the voltages V12, V22 applied to the primary windings 12, 22 of the transformers 10, 20, the secondary side of the transmission link has a demodulation circuit 50 which takes the secondary-side voltages V12, V22 and produces a received signal S'. In the event of error-free data transmission, this received signal S' corresponds to the transmitted signal S. Referring to FIG. 1, the demodulation circuit 50 has two differential amplifiers 51\_1, 51\_2 which tap off the secondary voltages V12, V22 and which respectively provide a differential signal $S51\_1$, $S51\_2$ which is dependent on the secondary voltage V12, V22. These differential signals $S51\_1$, $S51\_2$ are supplied to a demodulator 52 which produces the received signal S' from these differential signals $S51\_1$, $S51\_2$.

Figure 9:
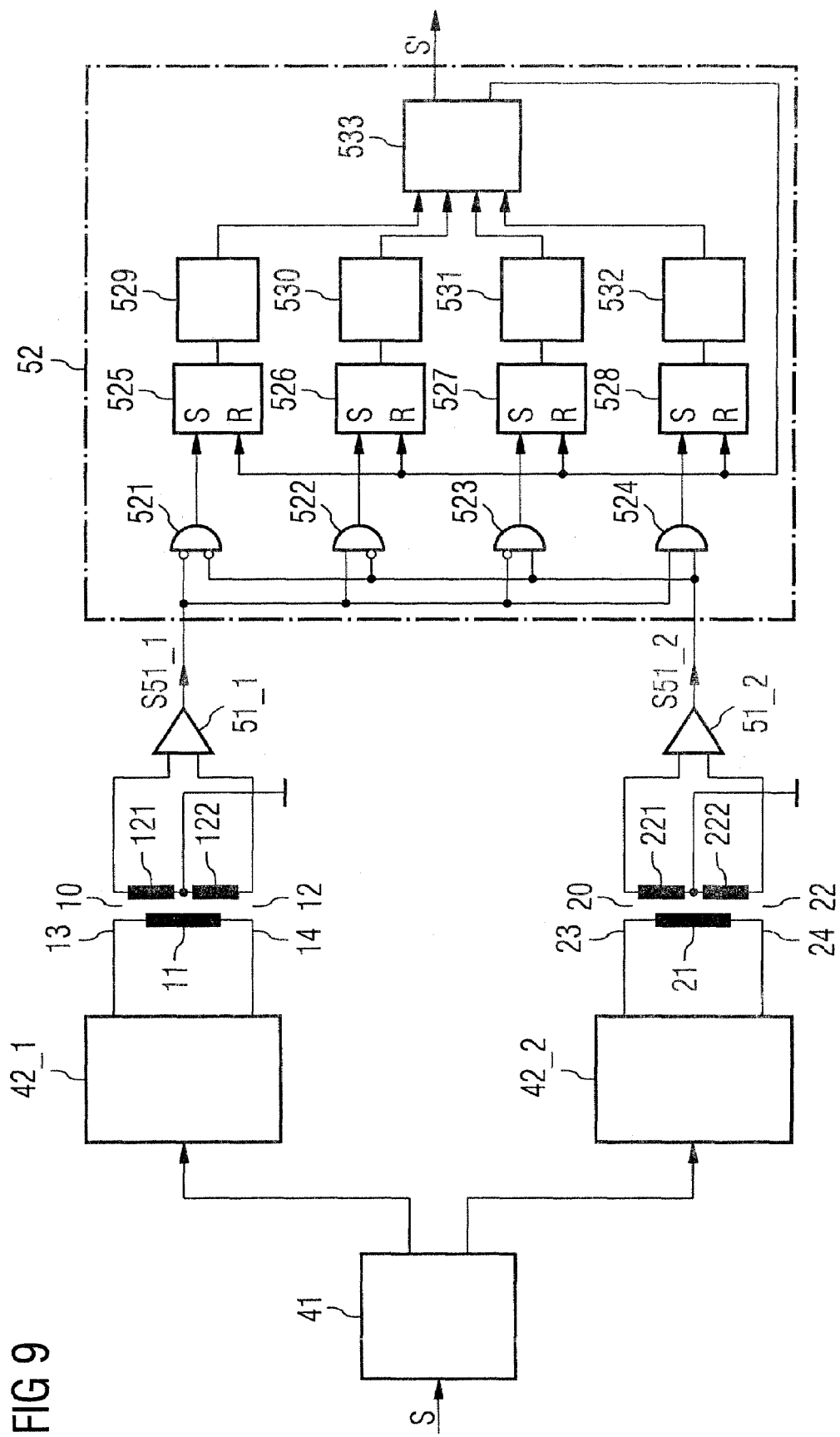
FIG. 9 shows illustrative details from a data transmission link having two inductive transformers, which respectively have a primary winding and a secondary winding with two winding sections, and having a receiver circuit for recovering a transmitted signal from voltages across the secondary windings of the inductive transformers.

In the illustrative embodiment shown in FIG. 9, the transformers 10, 20 are implemented such that their secondary windings 12, 22 each have two subwindings 121, 122 and 221, 222 which each have a connection connected to a terminal for a reference-ground potential, the two subwindings 121, 122 and 221, 222 of a transformer 10, 20 being wound in opposite senses. The time profile for the secondary voltages which can be tapped off between the connections of the subwindings 121, 122 and 221, 222 which are remote from the reference-ground potential connection corresponds in principle to that of the secondary voltages which arise for secondary windings with just one winding. A potential advantage of using a transformer with a two-part secondary winding over a transformer with the single-part secondary winding may be its greater robustness toward common-mode interference signals, that is to say signals which bring about the same change in the electrical potential on both connections of the primary winding.

For a succession of state changes brought about on the primary side, the differential signals $S51\_1$, $S51\_2$ which can be tapped off on the differential amplifiers 51\_1, 51\_2 contain a succession of positive and negative signal pulses which are dependent on the respective secondary voltages. The time profile for the differential signals $S51\_1$, $S51\_2$ in this case corresponds to the time profile for the secondary voltages, which is shown by way of example in FIG. 2.

The differential amplifiers 51\_1, 51\_2 have logic gates 521-524 connected downstream of them which, in the example, are in the form of AND gates with inverting or noninverting inputs which are respectively supplied with the two differential signals $S51\_1$, $S51\_2$ and which are used to detect primary-side state changes using the differential signals $S51\_1$, $S51\_2$ produced on the secondary side, with, referring to FIG. 2, a primary-side state change simultaneously or approximately simultaneously resulting in positive or negative voltage pulses on the secondary windings and hence in positive or negative signal pulses in the differential signals $S51\_1$, $S51\_2$. The logic gates are configured in this example to detect the four possible signal configurations which can be formed by positive and negative signal pulses in the differential signals $S51\_1$, $S51\_2$. Each of these signal configurations then corresponds to one of the signal patterns S1-S4 illustrated with reference to FIG. 4. A first gate 521 has two inverting inputs and produces a positive signal pulse at its output when both differential signals $S51\_1$, $S51\_2$ have a negative signal pulse, corresponding to the signal pattern S2 in FIG. 4. A second gate 522 is used to detect the signal pattern S3; this gate is supplied with the first differential signal $S51\_1$ directly and with the second differential signal $S51\_2$ in inverted form. A third gate 523 is supplied with the first differential signal $S51\_1$ in inverted form and with the second differential signal $S51\_2$ directly, and a fourth gate 524 is supplied with the two differential signals $S51\_1$, $S51\_2$ directly. The first gate 521 is used to detect a state change as illustrated by way of example in FIG. 2 at time t2, the second gate 522 is used to detect a state change as illustrated in FIG. 2 at time t3 and the third gate 523 is used to detect a state change as illustrated in FIG. 2 at time t1. The fourth gate 524 detects a state change for which there are positive voltage pulses on both secondary windings.

The gates 521-524 respectively have storage elements, such as in the form of flip flops 525-528, connected downstream of them, the outputs of the gates 521-524 respectively being connected to the SET input S of one of the flip flops 525-528. These flip flops 525-528 are used to store the state changes detected by the gates 521-524. A reconverter 533 connected downstream of the flip flops 525-528 ascertains the chronological order in which the flip flops 525-528 are set and uses this to ascertain the state succession produced on the primary side. In addition, the reconverter 533 performs an operation which is the inverse of the operation of the mapping unit 41 (FIG. 7), and its output outputs the data word associated with the respective state succession as output signal S'. Furthermore, the reconverter 533 has a control output which, when a data word is output, is used to reset the flip flops 521-524 for fresh detection of state changes.

The flip flops 525-528 and the reconverter 533 may have level converters 529-532 connected between them which are used to convert levels of the output signals from the flip flops 525-528 to suitable signal levels for the processing by the reconverter 533. Since each of the flip flops 525-528 in a demodulation circuit 52 can be set only once when a signal sequence is received, the demodulation circuit 52 is able to detect signal sequences with a maximum of four different state changes.

In some embodiments in which the reconverter 533 is able to ascertain the chronological order in which the individual flip flops 525-528 are set, 24 (=4·3·2·1) signal sequences may be distinguished with four different state changes.

In some embodiments of the demodulation circuit 52, the demodulation circuit 52 may be further configured to detect signal sequences with fewer than four state changes. In this case, the reconverter 533 may be implemented such that it evaluates the setting of the flip flops 525-528 only within a prescribed time window after a first instance of the flip flops has been set and outputs the data word associated with the respective state succession at the end of this time window, for example. In this context, the time window needs to be tuned to the maximum time period for a signal sequence produced on the primary side. The demodulator 52 shown in FIG. 9 can be used to distinguish 24(=4·3·2) signal sequences with three different state changes, 12(=4·3) signal sequences with two state changes, and four signal sequences with just one state change. In total, the demodulator 52 can therefore distinguish 64 (=24+24+12+4) signal sequences with a maximum of four different state changes, state changes with just one, just two or just three changes being a subset of these 64 changes. These 64 possible state changes allow transmission of data words with 6 (=log$_2$64) bits.

In further embodiments of the demodulation circuit 52, the reconverter 533 may be configured to detect those flip flops 525-528 which are set within a prescribed time window, but without necessarily being able to distinguish the order in which the flip flops are set. If the different configurations in which the flip flops 525-528 in the demodulation circuit 52 can be set are referred to as demodulator states, there are four different demodulator states with just one set flip flop, six distinguishable demodulator states with two set flip flops, four demodulator states with three set flip flops and one demodulator state with four set flip flops, so that such a demodulation circuit can distinguish just 15 different demodulator states.

The data transmission concepts explained previously, in which data words are converted to signal sequences which respectively represent state changes for signal transformers, may be self-synchronizing. In other words, it may not be necessary to transmit a separate clock signal in parallel with the signal sequences. Between the individual signal sequences, it may be desirable merely to observe a sufficient pause which allows for sufficient separation between two successively transmitted signal sequences to be distinguished at the receiver end.

The transmission concepts explained may be suitable for data transmission using air-core transformers integrated on a semiconductor chip. Secondary-side pulses in such transformers may last a short time, such as 1 ns or less, and the period for the individual activation states may be set to be relatively short as well, such as 4 ns or less. The interval between the individual signal sequences which respectively represent a data word may likewise be relatively short, such as 100 ns or less. The method therefore may allow for self-synchronizing transmission at a high data rate.

For the explanation thus far, it has been assumed that two transformers which are each activated alternately are available for the data transmission. However, more than two transformers may be used for the data transmission, the transformers being activated alternately such that a respective one of the transformers is in an activated state.

As already explained, the transmission signal succession S may be a data string which comprises exclusively useful data or may be an encoded data string which is formed by encoding from a useful data string. An example of an encoding method for producing a transmission signal succession S from a useful data string for the transmission method explained is explained below.

Figure 10:
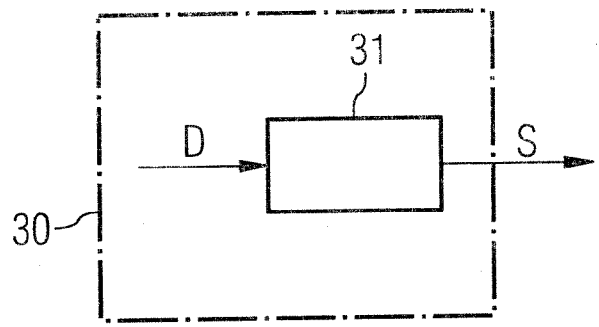
FIG. 10 schematically shows an illustrative data source having an encoder.

Referring to the example of FIG. 10, to provide the encoded transmission signal succession S from an unencoded data string D, which is subsequently referred to as the useful data string, an encoder 31 is provided which is supplied with the data string D and which provides the encoded data string S. By way of example, the encoder 31 may be part of the data source 30, the data string D being able to be stored in the data source 30 or supplied to this data source in any manner. The encoder 31 can assume a plurality of states, which are subsequently referred to as "encoder states", and prompts state-dependent encoding of the data string D, that is to say that the encoded signal succession S is dependent both on the data string D and on a present encoder state for the encoder 31. The encoded signal succession S is therefore a function f of the data string D and of the present encoder state Z, which can be shown as follows:

$$S=f(D, Z) \tag{1}$$

For the explanation which follows, it will be assumed that the encoder 31 can assume eight encoder states which are consecutively numbered 0 to 7, or in binary notation 000 to 111.

Figure 11:
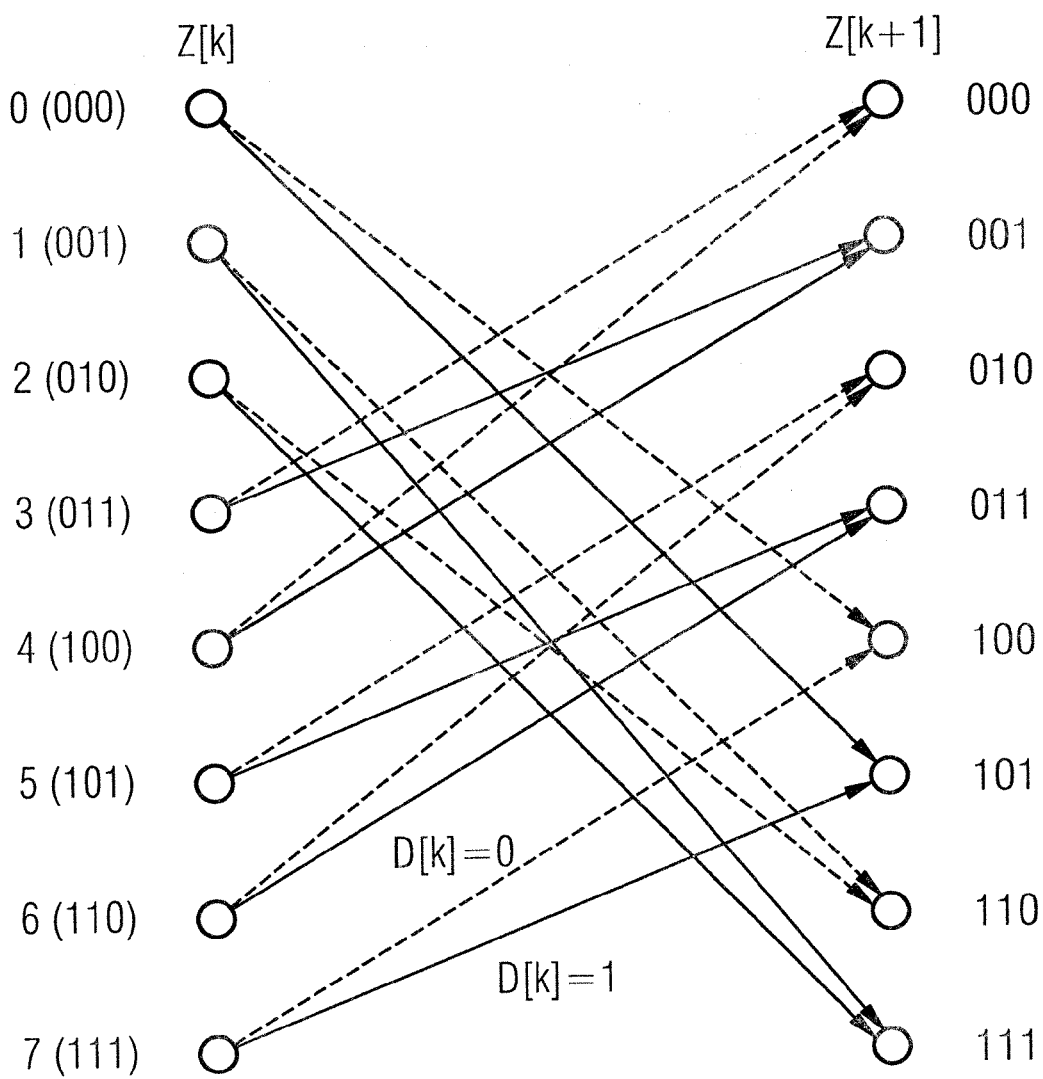
FIG. 11 shows an illustrative trellis diagram of an encoding method.

The encoder 31 changes its present state on the basis of the data string D. FIG. 11 shows an example of a trellis diagram for this encoder 31 which shows the state changes for this encoder 31 on the basis of the data string D. Z[k] and Z[k+1] in FIG. 11 denote successive encoder states. The arrows in FIG. 11 which are shown by solid lines and dashed lines illustrate possible state changes for the encoder on the basis of the data string D. D[k] in FIG. 11 denotes a data bit which brings about the respective state change. Dashed lines in FIG. 11 symbolize state changes which are brought about by a data bit D[k]=0, while solid arrows symbolize state changes which are brought about by a data bit D[k]=1. If the encoder 31 is in the state Z[k]=0 then when a data bit D[k]=0 is input it changes to the state Z[k+1]=4, whereas it changes to the state Z[k+1]=5 for a data bit D[k]=1.

The state changes in the encoder 31 in this example are explicit, that is to say that starting from a present state of the encoder 31 there are two state changes that can be realized: a state change for D[k]=0 and a state change for D[k]=1. Each state has two predecessor states, for example the state Z[k+1]=0 has the predecessor states Z[k]=3 and Z[k]=4. These predecessor states are chosen such that the state changes from these predecessor states are brought about by the same data bits. For the state Z[k+1]=0, for example, the state changes from the predecessor states Z[k]=3 and Z[k]=4 are made by the data bit D[k]=0.

The encoder 31 is configured to produce, for each data bit D[k] in a data string D, a data word having a word length of more than 1 bit which is dependent on the data bit D[k] and the respective present state Z[k] of the encoder. In the case of an encoder with eight ($=2^3$) possible encoder states, this data word is a three-bit data word, for example. Each of the possible combinations (on the basis of the trellis diagram) of present state Z[k] and data bit D[k] which result in a subsequent state Z[k+1] has an explicit data word associated with it in this case. By way of example, the data word which is output by the encoder 31 for each data bit D[k] in the data string D corresponds to a data word which is associated with the respective subsequent state Z[k+1]. For the explanation which follows, it will be assumed that the states are numbered from 000 to 111 and that the data word associated with the state Z[k+1] corresponds to the respective number of the state. In this context, the numbering is carried out such that states which result from a data bit D[k]=0 have an even number and states which result from a data bit D[k]=1 have an uneven number. The data bit in the data string D then appears as the least significant bit (LSB) in the three-bit data word produced by the encoder 31.

The transmission signal S, which contains a succession of data words which the encoder 31 is able to output on the basis of the data signal D, may be a single-bit signal in which the individual bits of the data words are serially successive. The data signal may alternatively be a data signal with a length of 3 bits, in which the data bits of the individual data words are transmitted in parallel.

Figure 12:
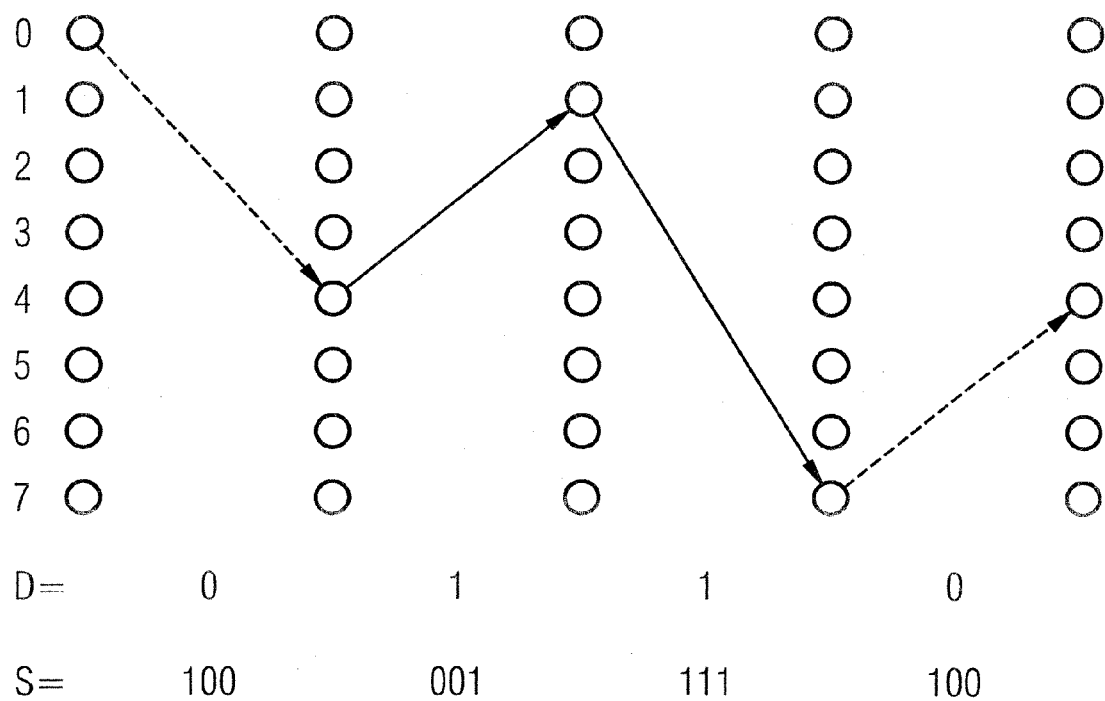
FIG. 12 shows illustrative encoding of a data string using an encoding method with a trellis diagram as shown in FIG. 11.

The production of the transmission signal succession S from the data string D using an encoder with eight encoding states and with an encoding behavior which is shown in the trellis diagram shown in FIG. 11 is explained below with reference to FIG. 12. For the explanation, it will be assumed that the encoder is in an initial state Z=0. By way of example, the data string D comprises the succession of data bits 0, 1, 0. Looking at the trellis diagram in FIG. 11, this data string produces a state succession 4-1-7-4, corresponding to the encoded signal succession 100, 001, 111, 100, on the basis of the initial state Z=0 in the encoder 31.

Referring to FIG. 1, the mapping unit 41 converts this transmission signal S to driver signals S42_1, S42_2 which result in activation states for the transformers 10, 20. When the encoding method explained is applied, provision is made, in this context, for the three data bits of a data word in the encoded signal S, which result from a data bit in the data signal D, to be converted to a succession of state changes for the transformers 10, 20 and for the signal sequences which result from these state changes, and which are transmitted using the transformers 10, 20, to be transmitted at intervals of time from one another. Referring to the previous statements, transmission of a three-bit data word using two transformers involves two state changes for the two transformers.

Figure 13:
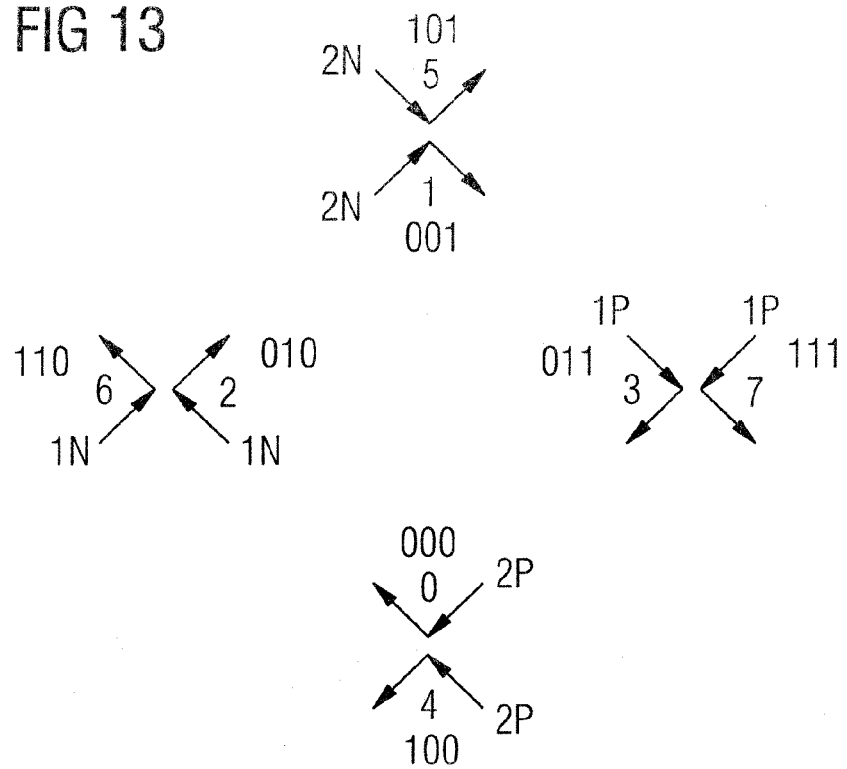
FIG. 13 shows an illustrative possible association between three-bit data words which are to be transmitted and state successions with two state changes for the transformers.

FIG. 13 illustrates, by way of example, the mapping of the eight three-bit data words onto state successions with two respective state changes, these state changes being shown in the form of the change vectors already explained previously. Thus, the data word 101 has the associated state succession 2N-1N-2P, for example. To achieve a high level of interference immunity for the data transmission, the association between the three-bit data words and the state successions for the transformers is chosen such that data words which represent the two singularly valid data words on the basis of an encoder state have opposite change vectors. This is illustrated with the aid of an example, as follows.

Starting from the encoding state Z=4, for example, the subsequent encoder states Z=0 or Z=1, which have the associated data words 000 and 001, are admissible, depending on the data bit in the data string D. The state successions 2P-1N-2N (for 000) and 2N-1P-2P (for 001) associated with these data words have respective opposite change vectors for both state changes, which, referring to FIG. 4, is synonymous with the signal pulses which arise on the secondary side of the transformers 10, 20 for these data words (000 and 001 in the example) being complementary to one another. Whereas the state succession 2P-1N-2N for the data word 000 produces two negative signal pulses and then a positive signal pulse on the first transformer and a negative signal pulse on the second transformer, the signal succession 2N-1P-2P involves opposite secondary-side signals, that is to say two positive pulses on both transformers followed by a negative pulse on the first transformer and a positive pulse on the second transformer. This association between the data words and the state successions and hence the signal sequences transmitted using the transformers 10, 20 is based on the idea of making a signal interval between two valid transmitted data words as large as possible and hence making the method as robust as possible in the face of interference.

Furthermore, the association between the data words and the state successions for the transformers is made such that data words whose MSB differs have the same change vectors in association with the state successions, but in a switched order. This is synonymous with the secondary-side signal sequences which result from the two data words having the same signal patterns but in a switched order. Thus, by way of example, the data word 011 has the associated state succession 1P-2P-1N, which, referring to FIG. 4, results in the signal pattern succession S1-S2 on the secondary side, whereas the data word 111 has the associated state succession 1P-2N-1N, which results in the signal pattern succession S2-S1 on the secondary side. Since the LSB of the data word is not altered, incorrect switching of the change vectors for the transmission may result in correct reconstruction of the data string from the data word received at the receiver end.

Figure 14:
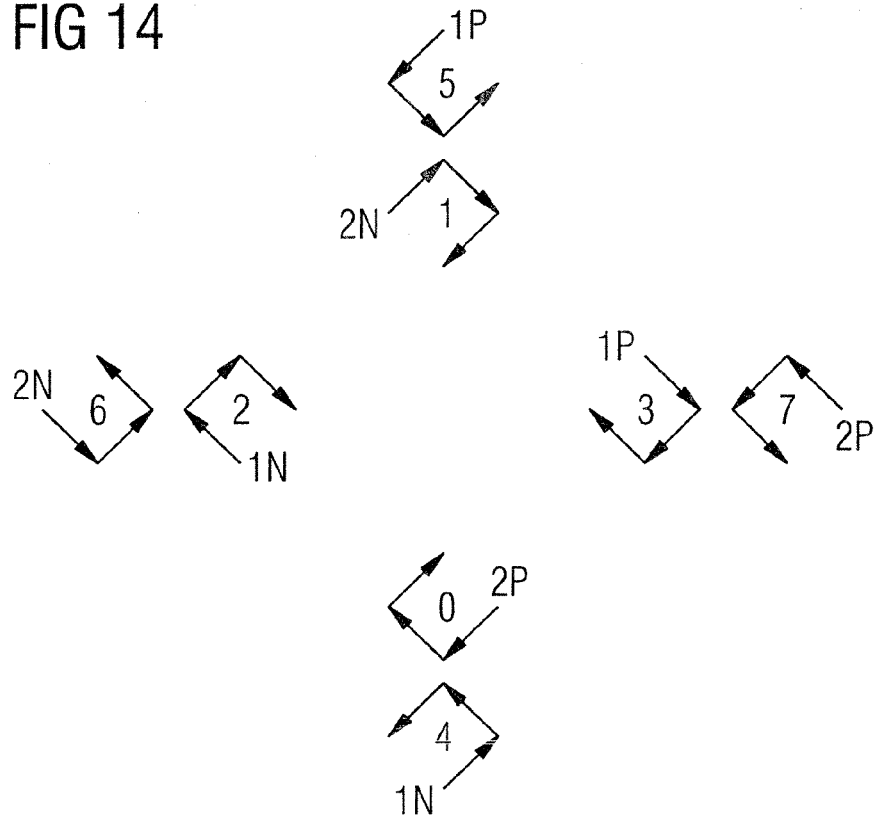
FIG. 14 shows an illustrative possible association between three-bit data words which are to be transmitted and state successions with three state changes for the transformers.

To possibly increase interference immunity further, and referring to FIG. 14, it may be desirable to associate a state succession having three state changes with each of the three-bit data words, successive state changes respectively having orthogonal change vectors. In this case too, the association between these state changes and the data words is made such that the two data words which are valid starting from an initial state have associated state changes for which the individual states are encountered in the opposite order. Data words whose MSB differs have the associated state successions such that the order of the first state change and of the third state change from the three state changes is switched.

The encoder's state changes shown in trellis diagram in FIG. 11 and the data words resulting from these state changes may be chosen such that the difference between successive data words can assume only three different values, specifically regardless of whether the two successive data words are each even-numbered or each uneven-numbered or whether an even-numbered data word follows an uneven-numbered data word or an uneven-numbered data word follows an even-numbered data word. Assuming that the data words which are output correspond to the state numberings Z, the following applies for encoding as shown in FIG. 11:

$Z[k+1]-Z[k]=4$ for $Z[k+1]$ even and $Z[k]$ even  (2a)

$Z[k+1]-Z[k]=5$ for $Z[k+1]$ uneven and $Z[k]$ even  (2b)

$Z[k+1]-Z[k]=5$ for $Z[k+1]$ even and $Z[k]$ uneven  (2c)

$Z[k+1]-Z[k]=6$ for $Z[k+1]$ uneven and $Z[k]$ uneven  (2d)

Evaluation of the difference between the data words received on the secondary side taking account of the even-numbered nature or uneven-numbered nature of the received data words therefore may allow transmission errors to be detected in this method.

The encoding method explained with reference to FIG. 11 furthermore may also allow for various error corrections when the difference between two successive data words is used to detect an error. This method may allow for correction of an erroneous data word between two data words if the difference between these two data words meets a condition which is explained with reference to FIG. 15. The trellis diagram shown in FIG. 11 is chosen such that the difference between two data words, one of which is situated directly before the erroneous data word and another of which is situated directly after the erroneous data word, can be used to infer the correct value of the data bit transmitted by the erroneous data word. For the explanation which follows, it will be assumed that Z[i] is an erroneous data word, that Z[i−1] is a data word transmitted directly before the erroneous data word, and Z[i+1] is a data word transmitted directly after the erroneous data word. Referring to the table shown in FIG. 15, the data bit transmitted by the erroneous data word Z[i] can be reconstructed when the difference Z[i+1]−Z[i−1] between the data words transmitted before and after the erroneous data word is 1, 2 or 3. For an even-numbered data word Z[i−1], the correct data bits are shown in the center column in the table in FIG. 15, and for an uneven-numbered data word Z[i−1] the correct data bits for these differences are shown in the right-hand column. In the case of differences Z[i+1]−Z[i−1] of 5, 6 or 7, no direct error correction may be possible. These differences are not valid either for an even-numbered data word or for an uneven-numbered data word Z[i−1], which means that it can be assumed that a plurality of erroneous data bits are transmitted in succession.

For a difference Z[i+1]−Z[i−1] of 0, it is possible to construct the data bit transmitted by the erroneous data bit Z[i−1] just for an even-numbered data word Z[i−1], whereas for a difference Z[i+1]−Z[i−1] of 4 it is possible to reconstruct the data bit transmitted by the erroneous data word Z[i] just for an uneven-numbered data word Z[i−1].

Various illustrative error scenarios, and the error correction thereof, are explained below with reference to FIGS. 16 to 18. FIG. 16 illustrates a succession of successive data words Z'[i−2] ... Z'[i+2] which are on the secondary side after the demodulation and also before the decoding. It will be assumed that equations (2a)-(2d) are used to ascertain an erroneous difference between a data word Z'[i] and the previous data word Z'[i−1] and also between the subsequent data word Z'[i+1] and the data word Z'[i]. These erroneous differences are illustrated in FIG. 16 by dashed lines and a minus sign, while correct differences are illustrated by solid lines between two successive data words and a plus sign. With such an error configuration, it is assumed that the data word Z'[i] is erroneous, and the difference between the data words Z'[i+1], Z'[i−1] received after this data word and before this data word is ascertained. If this difference is valid taking account of the table explained with reference to FIG. 15, the data bit transmitted by the erroneous data word Z'[i] is corrected on the basis of this table.

FIG. 17 illustrates an error configuration for which, in a succession of received data words, the error detection criteria from (2a)-(2d) are used to identify just one difference, in the example shown the difference between Z'[i] and Z'[i−1], as being erroneous. For the error correction, it is first of all assumed that of the two data words whose difference is invalid, the data word received later, in the present case Z'[i] is erroneous. The difference between the neighboring data words, in the example Z'[i+1], Z'[i−1], and the table in FIG. 15 is then used to attempt to correct this error. Should the difference between the adjacent data words taking account of the table in FIG. 15 turn out to be invalid, it is assumed in a subsequent step that the first data word transmitted from the two data words which provide an erroneous difference is erroneous. An attempt is then made to correct the data bit transmitted by this data word which is assumed to be erroneous using the difference between the data words transmitted before and after this data word, in the present case using the data words Z'[i] and Z'[i−2].

The encoding explained with the aid of the trellis diagram in FIG. 11 may allow for further error correction, which is explained below with reference to FIGS. 18 and 19. FIG. 18 illustrates a succession of successively transmitted data words with a data block of four successive data words Z'[i−3] ... Z'[i] within which one or more errors are detected from the relationships (2a)-(2d). The difference between the first data word, in the example Z'[i−3], in this data block and the previous data word Z'[i−4] is correct in this case, and the same applies to the difference between the data word Z'[i+1] which comes after the final data word Z'[i] in the data block and the final data word Z'[i]. The difference between the final data word Z'[i] and the penultimate data word Z'[i−1] in the data block is assumed to be invalid, and the other two differences within this data block may be valid or invalid, which is symbolized in FIG. 18 by dash-dot lines and circles.

With a configuration of this type, in which at least one difference within a data block containing four data words is invalid, it is possible—provided that no correction using the method explained in FIGS. 14 to 17 is possible—to ascertain how many data bits having a particular value are transmitted by the first three data words Z'[i−3] ... Z'[i−1] in the data block. To this end, the difference between the final data word Z'[i] in the data block and the data word Z'[i−4] transmitted before this data block is ascertained. These difference values, which may be between 0 and 7, are shown in the left-hand column of a table which is shown in FIG. 19. Depending on the value of this difference and depending on whether the data word Z'[i−4] transmitted or received before the data block is even or uneven, it is possible to ascertain how many data bits with D[k]=1 are transmitted by the first three data words Z'[i−1] ... Z'[i−3] in the data block in the case of no error. In this context, N in FIG. 19 denotes the number of these data bits D[k]=1.

The invention claimed is:

1. A method, comprising:
   encoding a plurality of bits into a plurality of pairs of simultaneous electrical pulses, wherein encoding comprises:
      applying a plurality of input electrical pulses that depend on the plurality of bits to a primary winding of a first transformer and a primary winding of a second transformer, such that the first and second transformers are respectively put alternately into one of two activation states, and
      generating the plurality of pairs of simultaneous electrical pulses at secondary windings of the first and second transformers; and
   recreating the plurality of bits from a combination of the electrical pulses generated at the secondary winding of the first transformer and the electrical pulses generated by the secondary winding of the second transformer,
   wherein each of the primary windings has a time constant, and each of the input pulses has a length longer than the time constant.

2. The method of claim 1, wherein encoding comprises encoding each of the plurality of bits into at least two of the pairs of simultaneous electrical pulses.

3. The method of claim 1, wherein applying comprises applying each of the electrical pulses so as to be separated by a period of no voltage applied to the primary winding of the respective transformer.

4. The method of claim 3, wherein the period of no voltage is of a same length as each of the plurality of applied electrical pulses.

5. The method of claim 1, wherein the length of each of the input pulses is at least 1.5 times longer than the time constant.

6. The method of claim 1, wherein for each bit, encoding comprises generating an alternating pair of input electrical pulses and generating the pairs of simultaneous electrical pulses from the alternating pair of input electrical pulses.

7. A method, comprising:
generating a first plurality of electrical pulses and a second plurality of electrical pulses, such that the first and second plurality of electrical pulses alternate and depend upon a value of a received data bit;
generating a third plurality of electrical pulses based on the first plurality of electrical pulses; and
generating a fourth plurality of electrical pulses based on the second plurality of electrical pulses,
wherein each of the pulses of the first and second pluralities of pulses comprises a rising edge and a falling edge, generating the third plurality of pulses comprises generating the third plurality of pulses responsive to the rising and falling edges of the first plurality of pulses, and generating the fourth plurality of pulses comprises generating the fourth plurality of pulses responsive to the rising and falling edges of the second plurality of pulses.

8. The method of claim 7, wherein generating the third plurality of pulses comprises generating two of the third plurality of pulses for each one of the first plurality of pulses, and generating the fourth plurality of pulses comprises generating two of the fourth plurality of pulses for each one of the second plurality of pulses.

9. The method of claim 7, wherein generating the third and fourth pulses comprises generating successive pairs of one of the third plurality of pulses and one of the fourth plurality of pulses simultaneously with each other.

10. The method of claim 7, further comprising reconstructing the received data bit from the third and fourth plurality of pulses.

11. An apparatus, comprising:
a first circuit portion configured to output a first plurality of pulses and a second plurality of pulses, the first and second plurality of pulses depending upon a value of a received data string;
a first transformer having a first primary winding and a first secondary winding and configured to receive the first plurality of pulses at the first primary winding and to generate a first signal at the first secondary winding based on the first plurality of pulses, wherein the first transformer can assume a quiescent state, a first activation state, and a second activation state of the first transformer; and
a second transformer having a second primary winding and a second secondary winding and configured to receive the second plurality of pulses at the second primary winding and to generate a second signal at the second secondary winding based on the second plurality of pulses, wherein the second transformer can assume a quiescent state, a first activation state, and a second activation state of the second transformer,
wherein the first circuit portion is configured to convert the data string to at least some of the activation states of the first and second transformers such that the first and second transformers alternately assume one of the activation states for an activation period, with a succession of state changes respectively comprising deactivation of one of the transformers and activation of the other of the transformers that depend on the data string.

12. The apparatus of claim 11, wherein the first circuit portion is configured to generate the first and second pulses in an alternating fashion.

13. The apparatus of claim 11, further comprising a second circuit portion configured to generate a second data bit based on the first and second signals.

14. The apparatus of claim 11, wherein the first and second transformers are each an air-core transformer.

15. A data transmission method for transmitting a data string over a potential barrier, comprising:
providing a first transformer having a primary winding and a secondary winding, wherein the first transformer can assume a quiescent state and first and a second activation states of the first transformer;
providing a second transformer having a primary winding and a secondary winding, wherein the second transformer can assume a quiescent state and a first and a second activation state of the second transformer; and
converting the data string to the first and second activation states of the first and second transformers such that the first and second transformers alternately assume one of the first and second activation states for an activation period, with a succession of state changes which respectively comprise deactivation of one transformer and activation of the other transformer being dependent on the data string.

16. The data transmission method of claim 15, wherein converting the data string to the first and second activation states comprises converting the data string such that at least three different combinations of the first and second activation states arise.

17. The data transmission method of claim 15, wherein the primary windings of the first and second transformers respectively have a first and a second connection, and wherein the first and second activation states for each of the first and second transformers are achieved by applying a voltage potential to one of the first and second connections of the primary winding.

18. The data transmission method of claim 15, wherein the transformers undergo each of the state changes within a change period, the change period of an initial one of the succession of state changes being longer than the change period for others of the succession of state changes.

19. The data transmission method of claim 18, wherein the change period of a final one of the state changes for transmitting the data string is also longer than the change period for others of the state changes for transmitting the data string.

20. The data transmission method of claim 18, wherein the primary windings respectively have a time constant and in which the activation periods of the first and second transformers are respectively longer than the time constants, and wherein the change period of the initial one of the succession of state changes is longer than the time constants.

21. The data transmission method of claim 20, wherein the change period of a final one of the state changes for the deactivation of the last-activated transformer is longer than the change period for others of the state changes, and wherein the change period of the final one of the state changes is longer than the time constants.

22. The data transmission method of claim 15, wherein the primary windings respectively have a time constant and in which the activation periods of the first and second transformers are respectively longer than the time constants.

23. The data transmission method of claim 22, wherein the activation periods are of a length of time in a range of 1.5 to 2.5 multiplied by the respective time constants.

* * * * *